(12) United States Patent
Wu

(10) Patent No.: US 7,240,586 B2
(45) Date of Patent: Jul. 10, 2007

(54) AUXILIARY POWER UNIT STARTING APPARATUS FOR AN ELECTRIC BICYCLE

(76) Inventor: Donald P. H. Wu, No. 108, Hsin-He Road Hsin-Feng Hsiang, Hsinchu County (TW)

( * ) Notice: Subject to any disclaimer, the term of this patent is extended or adjusted under 35 U.S.C. 154(b) by 352 days.

(21) Appl. No.: 11/080,016

(22) Filed: Mar. 14, 2005

(65) Prior Publication Data

US 2006/0201728 A1  Sep. 14, 2006

(51) Int. Cl.
*G05G 1/14* (2006.01)
*B62M 1/02* (2006.01)

(52) U.S. Cl. .................. 74/594.1; 74/594.2; 280/259; 280/205; 280/206

(58) Field of Classification Search .............. 74/594.1, 74/594.2; 280/259, 206, 205
See application file for complete search history.

(56) References Cited

U.S. PATENT DOCUMENTS

| 5,242,028 | A | * | 9/1993 | Murphy et al. | 180/220 |
| 5,272,938 | A | * | 12/1993 | Hsu et al. | 74/594.1 |
| 5,704,441 | A | * | 1/1998 | Li | 180/206 |
| 5,771,754 | A | * | 6/1998 | Smeeth | 74/594.2 |
| 6,173,801 | B1 | * | 1/2001 | Kakutani et al. | 180/220 |

* cited by examiner

*Primary Examiner*—Lesley D. Morris
*Assistant Examiner*—Marlon Arce-Diaz
(74) *Attorney, Agent, or Firm*—Charles E. Baxley (57) ABSTRACT

The present invention relates to an auxiliary power unit starting apparatus for an electric bicycle, which can convert the rider's pedaling force into mechanical displacement at the time the bicycle is being pedaled, and then the mechanical displacement can start the auxiliary power unit of the electric bicycle. The device of the present invention has simple structure and small size, and it can be easily manufactured and assembled.

4 Claims, 8 Drawing Sheets

AUXILIARY POWER UNIT STARTING APPARATUS FOR AN ELECTRIC BICYCLE

BACKGROUND OF THE INVENTION

1. Field of the Invention

The present invention relates to an auxiliary power unit starting apparatus for an electric bicycle, more particularly to a starting apparatus that can convert the rider's pedaling force into mechanical displacement at the time the rider is pedaling the bicycle, and the mechanical displacement can start the auxiliary power unit of the electric bicycle.

2. Description of the Prior Arts

Electric bicycle is very popular with all age groups due to it is environment friendly and has the advantage of and easy operation. So far, there are various methods and times of starting the auxiliary power unit of an electric bicycle.

For example, the electric bicycle in the early days was always provided at the left handlebar with a switch that is to be controlled by the user, however, the operation of it is not easy since the user has to control the switch by hand. Therefore, JP Patent Application 20001-055399 discloses a method of detecting the running resistance and the running speed by using precision-control unit, and then the running data collected and calculated by the precision-control unit is used to control the time of starting the motor. Besides, JP Patent Applications 2001-301293 and 09-268415 also disclose a method of controlling the time of starting the motor based on the running data that are measured by dynamometer, logic circuit and the like electronic element.

Another method is disclosed in JP Patent application 11-290777, in which, an idler shaft is disposed parallel to and between the crank axle and the output axle, and pedaling-force measuring device is mounted on the idler shaft for measuring the pedaling force applied to the crank axle, and then the motor starting time is controlled based on the pedaling force.

As mentioned above, for most of the conventional electric bicycles, their time of starting the auxiliary power unit is controlled by precision-control electronic componentor sensor that is used to detect the running resistance or the pedaling force, and then the time of starting the auxiliary power unit is controlled based on the running data. However, by using the electronic precision electronic elements and complicated measuring instruments, the cost and the failure rate will be accordingly high. Furthermore, by using electronic component to judge the pedaling force of the rider, would probably give rise to a false judgment. For example, the riders of all age groups may have different pedaling force, so if the reference value of the pedaling force is set at a over high level, it will be resulted in an uneasy operation, and if the reference value of the pedaling force is set at a too low level, it will result in a false starting time of starting the motor.

The present invention has arisen to mitigate and/or obviate the afore-described disadvantages.

SUMMARY OF THE INVENTION

The primary objective of the present invention is to provide an auxiliary power unit starting apparatus for an electric bicycle, which can convert the rider's pedaling force into mechanical displacement at the time the bicycle is being pedaled, and then the mechanical displacement can start the auxiliary power unit of the electric bicycle. The device of the present invention has simple structure and small size, and it can be easily manufactured and assembled.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Referring to FIGS. 1-6, an auxiliary power unit starting apparatus for an electric bicycle in accordance with a preferred embodiment of the present invention is shown and comprises a sprocket 20, a driving disc 30, a plurality of positioning springs 40, a crank arm 50, a plurality of triggers 60, a triggering disc 70 and a switch 80.

Figure 1:
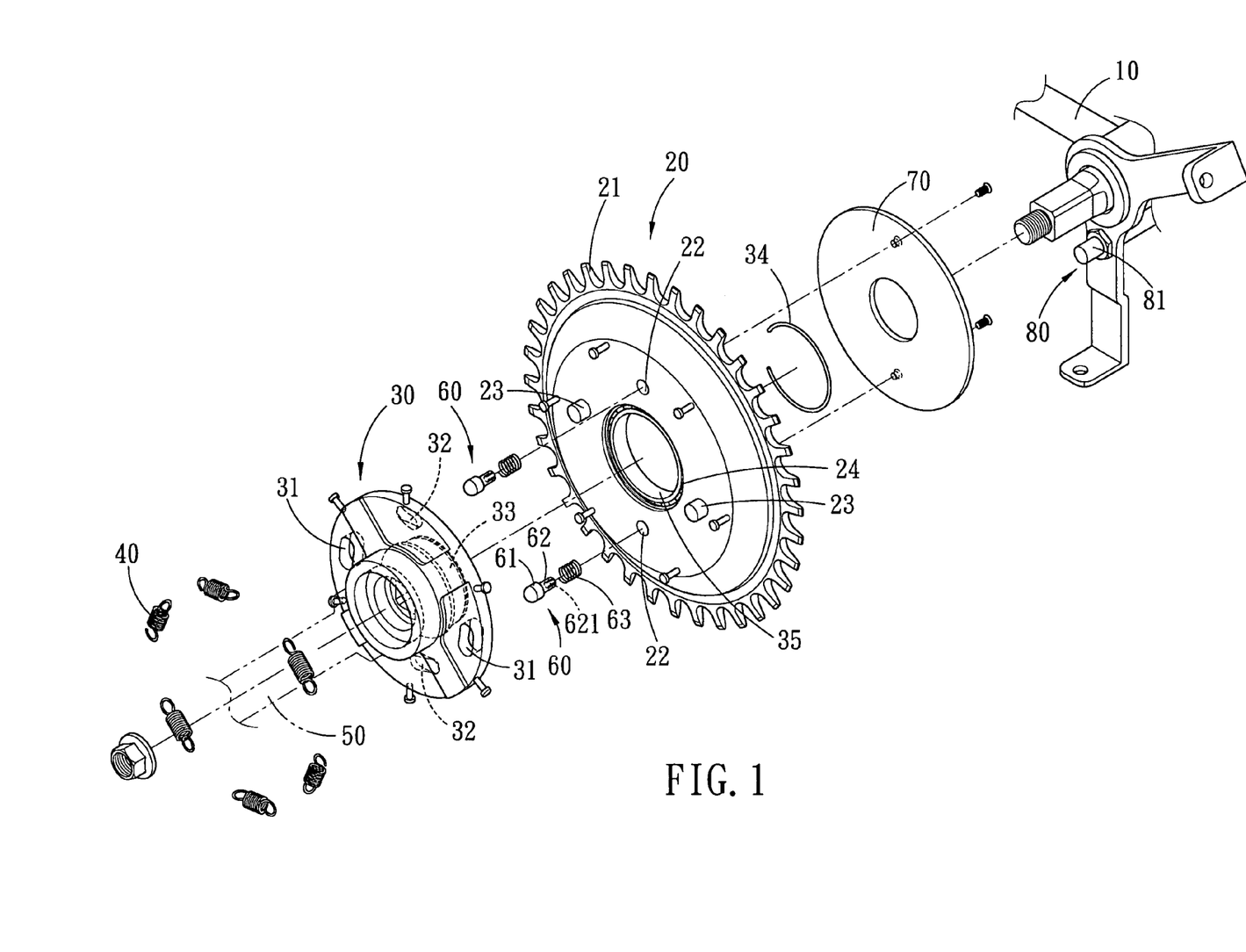
FIG. 1 is an exploded view of an auxiliary power unit starting apparatus for an electric bicycle in accordance with the present invention.
Figure 3:
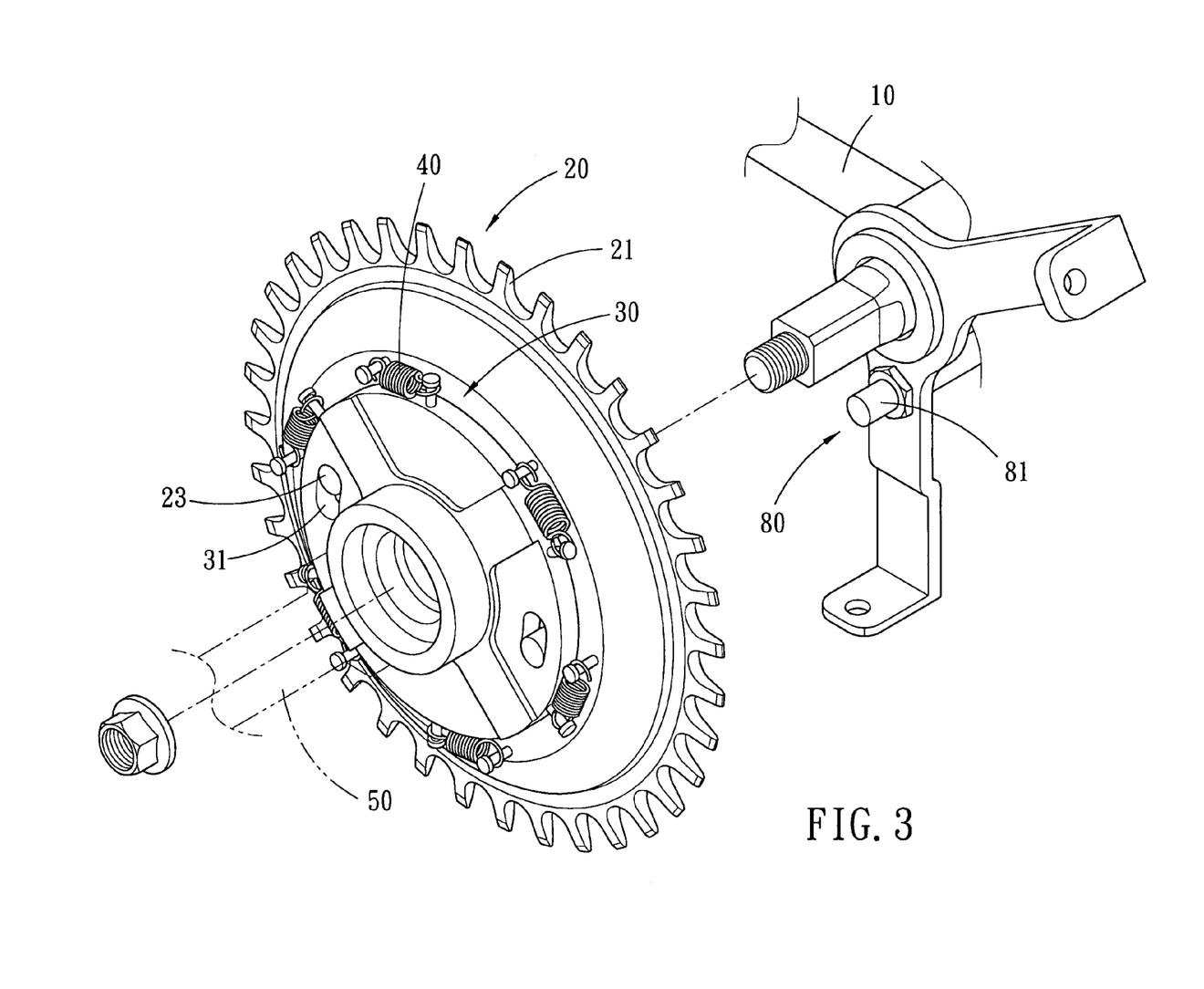
FIG. 3 is an assembly view of an auxiliary power unit starting apparatus for an electric bicycle in accordance with the present invention.
Figure 4:
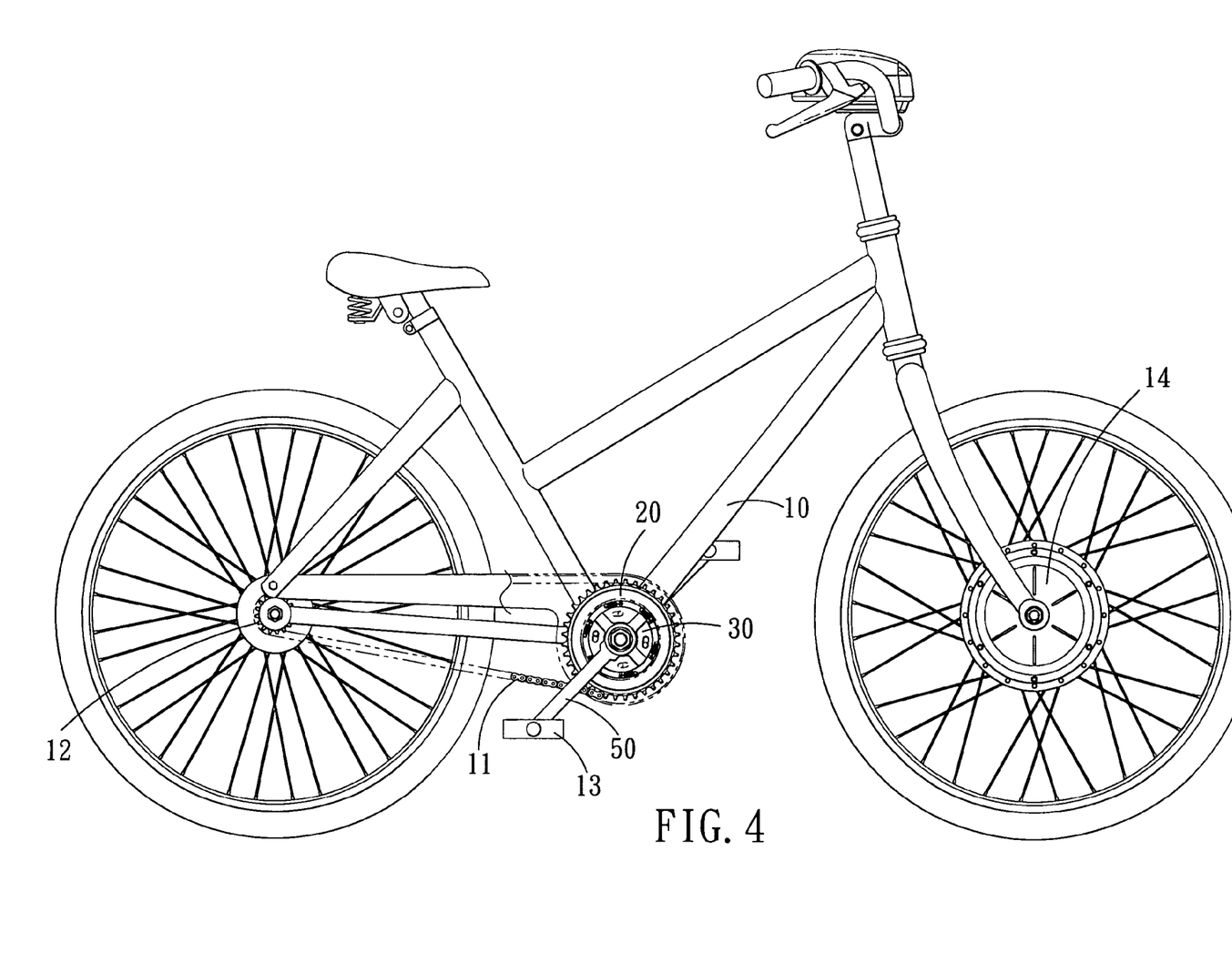
FIG. 4 shows an electric bicycle equipped with an auxiliary power unit starting apparatus in accordance with the present invention.
Figure 5:
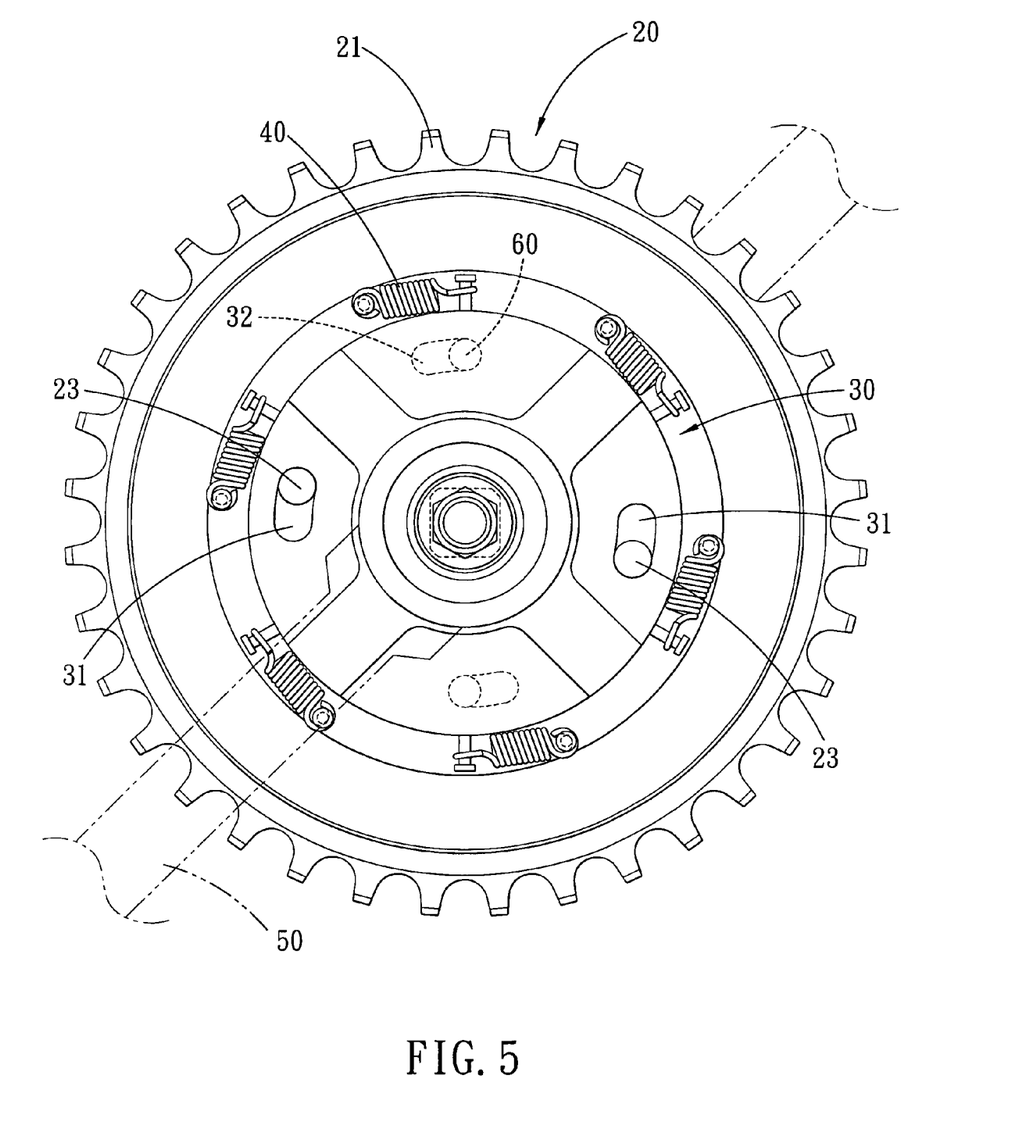
FIG. 5 is a plan view of the auxiliary power unit starting apparatus for an electric bicycle in accordance with the present invention.
Figure 6:
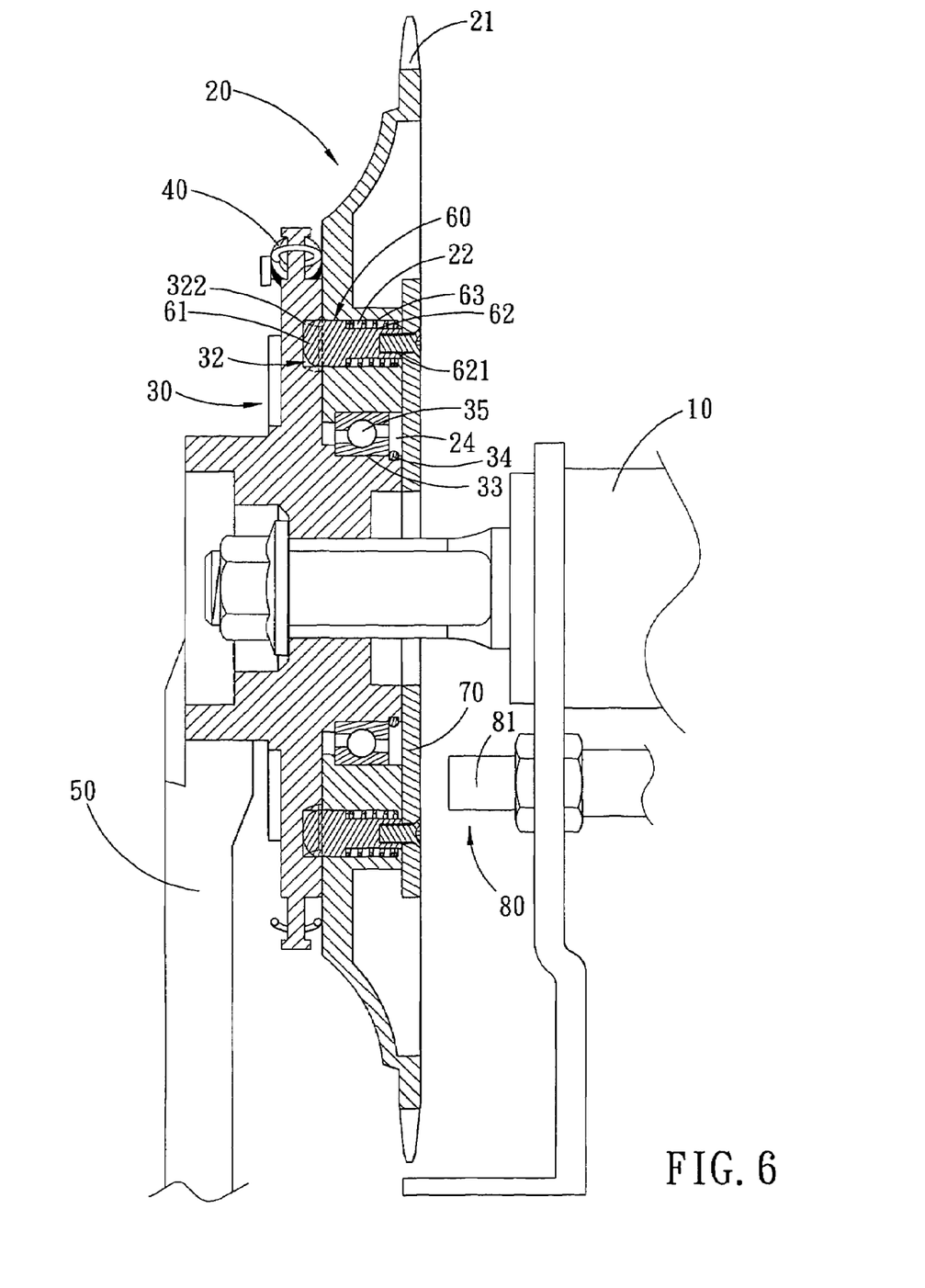
FIG. 6 is a side view of the auxiliary power unit starting apparatus for an electric bicycle in accordance with the present invention.

The sprocket 20 is rotatably fixed to the frame 10, the peripheral teeth 21 of the sprocket 20 are meshed with a chain 11 that is connected to the flywheel 12 of the rear wheel, thus forming a bicycle drive train. On the sprocket 20 are arranged a plurality of openings 22 and a central hole 24, and at a side of the sprocket 20 are formed a plurality of projections 23.

Figure 2:
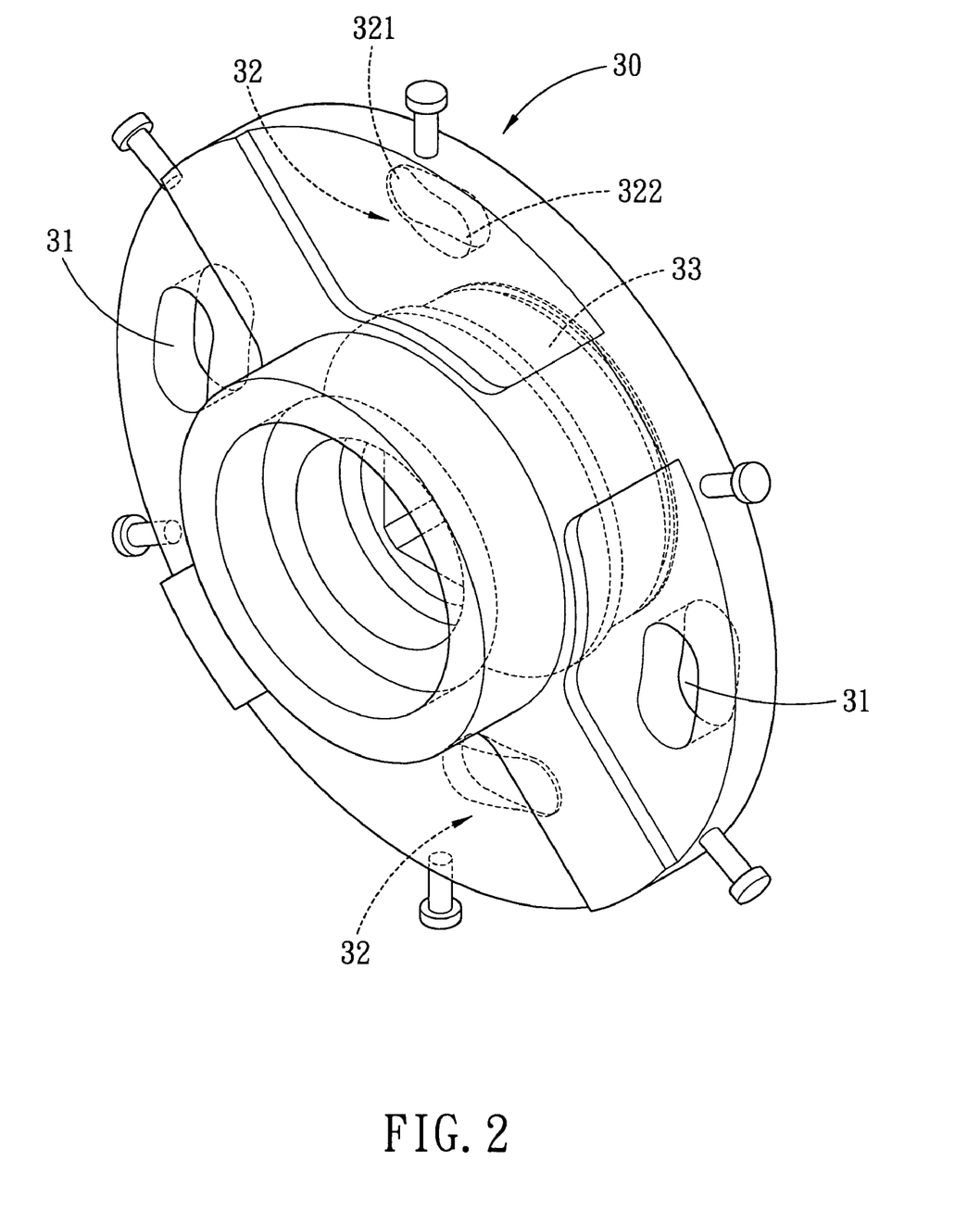
FIG. 2 is an amplified view of a driving disc of the present invention.

The driving disc 30 is rotatably disposed at a side of the sprocket 20 in such a manner that an axial tube 33 at a side of the driving disc 30 is engaged in the central hole 24 of the sprocket 20, and a C-shaped retainer 34 is used to stop the disengagement of the driving disc 30. Between the axial tube 33 and the central hole 24 is arranged a bearing 35. The driving disc 30 is provided with a plurality of limiting holes 31 which are to be correspondingly inserted in the projections 23 of the sprocket 20, so that the driving disc 30 is allowed to rotate relative to the sprocket 20 within the limit of the limiting hole 31. At the abutting side of the driving disc 30 abutting the sprocket 20 are arranged a plurality of chutes 32 each of which is slanted from a shallow end 321 towards a deep end 322 gradually.

Two ends of the positioning springs 40 are hooked to the driving disc 30 and the sprocket 20, respectively, so as to make the projections 23 abut against an end of the limiting holes 31.

The crank arm 50 is fixed to the driving disc 30, and a pedal 13 is disposed at the end of the crank arm 50.

Each of the triggers 60 includes a thick portion 61 and a thin portion 62, at a top surface of the thin portion 62 is formed a threaded hole 621. A return spring 63 is axially mounted on the thin portion 62, and the thin portion 62 of the trigger 60 is set in the openings 22 of the sprocket 20, so that the thick portion 61 of the triggers 60 abut against the deep end 322 of the respective chutes 32.

The triggering disc 70 is disposed at another side of the sprocket 20 in such a manner that the threaded hole 621 on the thin portion 62 of the triggers 60 is fixed to the surface of the triggering disc 70 by means of screws.

The switch 80 is located at the same side of the sprocket 20 as the triggering disc 70, when it is triggered by the triggering disc 70 at a right time, the auxiliary power unit of the electric bicycle will be started.

Figure 7:
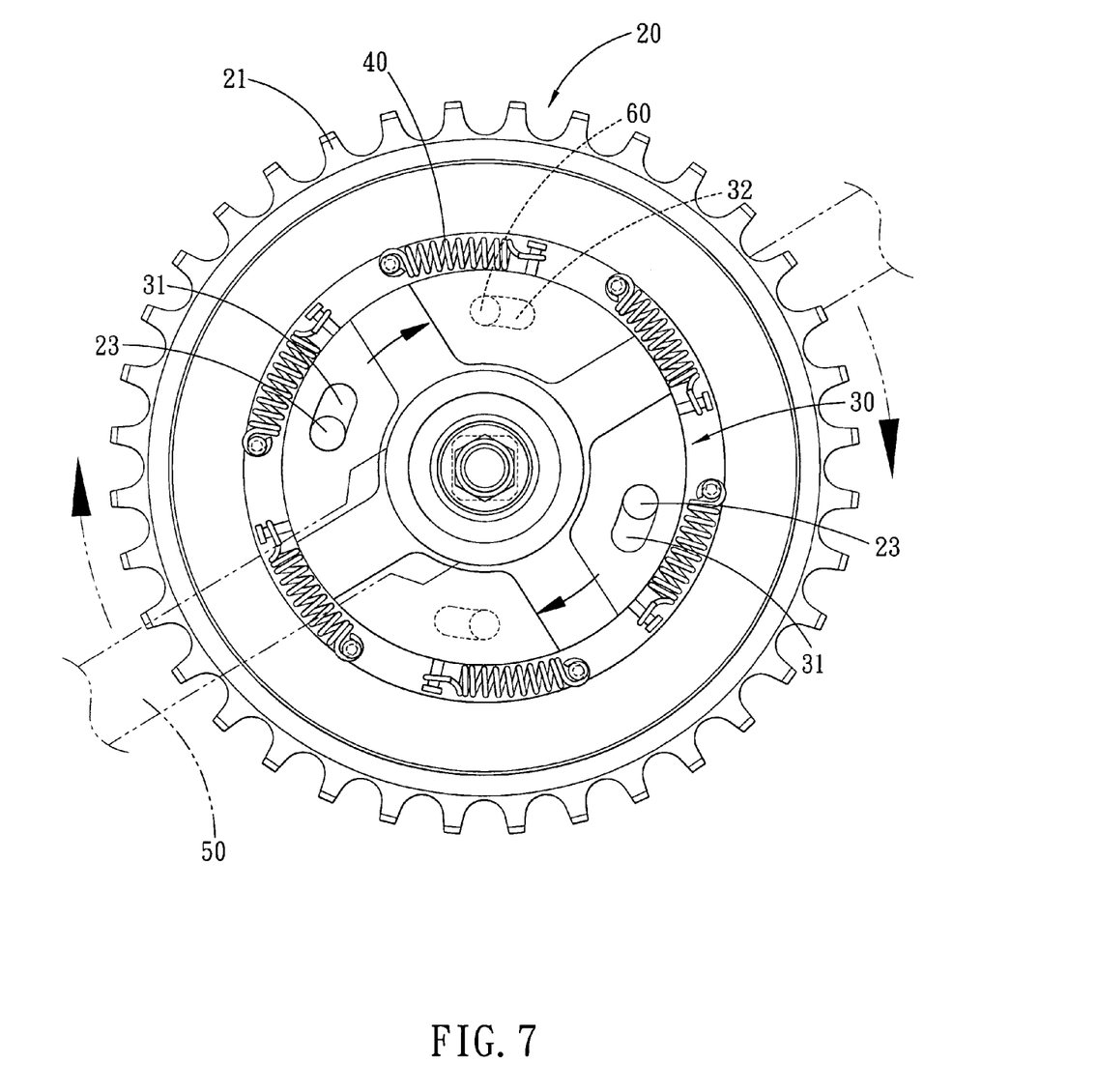
FIG. 7 is an operational plan view of the auxiliary power unit starting apparatus for an electric bicycle in accordance with the present invention.
Figure 8:
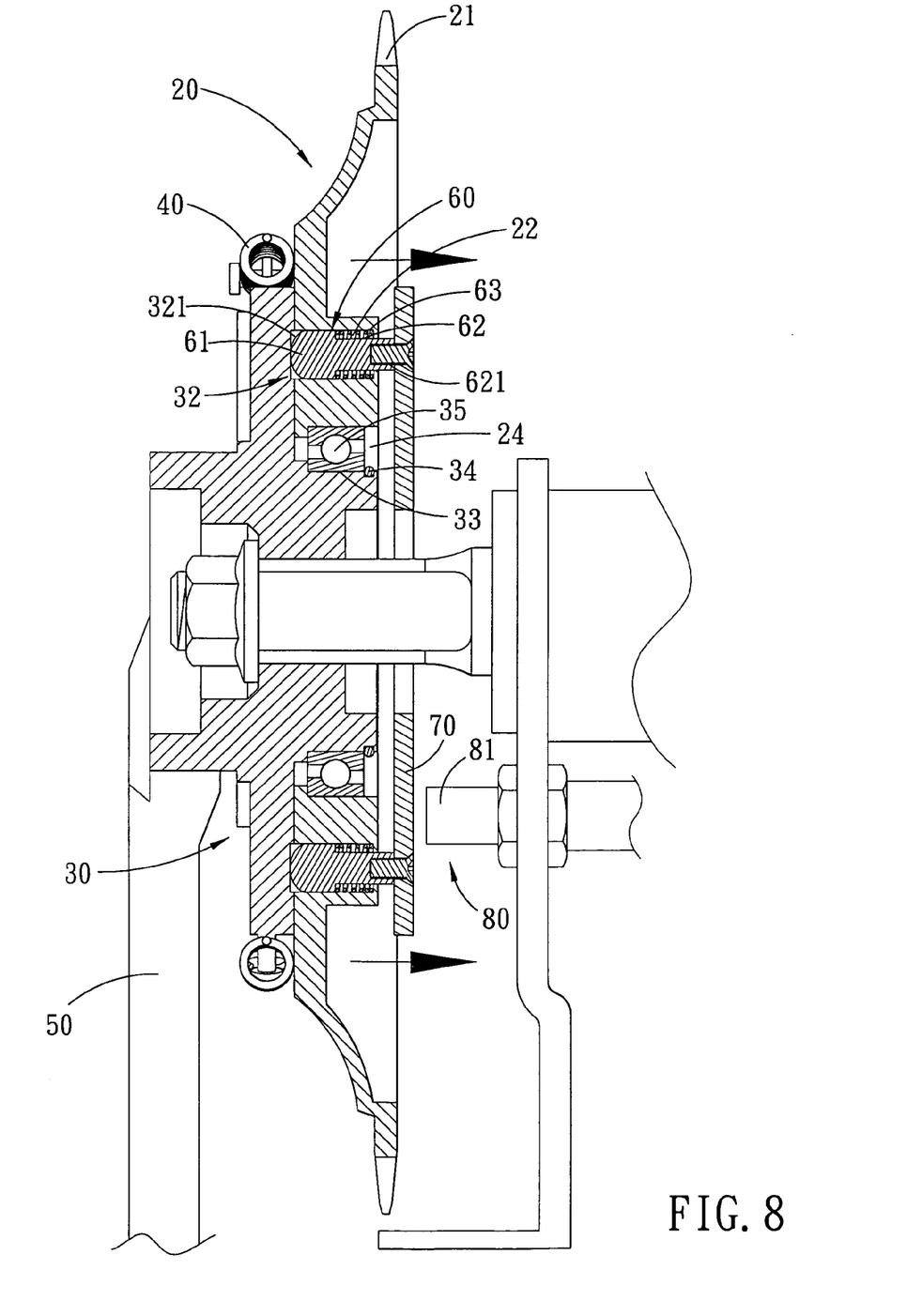
FIG. 8 is an operational side view of the auxiliary power unit starting apparatus for an electric bicycle in accordance with the present invention.

At the instant that the pedal 13 is being pedaled, the crank arm 50 will be caused to rotate, so will the driving disc 30 since it is linked to the crank arm 50. The rotation travel of the driving disc 30 is limited by the limiting holes 31 and the projections 23 (as shown in FIG. 7), the rotation of the driving disc 30 will cause a movement of the projection 23 from one end of the limiting hole 31 to the other, meanwhile, the thick portion 61 of the trigger 60 will move gradually from the deep end 321 of the chute 32 toward the shallow end 321. After the trigger 60 moves to the shallow end 321, the trigger 60 will be caused to push the triggering disc 70 outward (as shown in FIG. 8). Thus, the outward movement of triggering disc 70 will trigger the switch 80 to start the auxiliary power unit 14.

It is to be noted that, unlike the conventional method of detecting the pedaling force of the rider, the device of the present invention is to transform the pedaling force into mechanical displacement (the outward movement of the triggering disc), and then the mechanical displacement can trigger the switch 80 to start the auxiliary power unit without application of any electronic components. Furthermore, the device of the present invention has simple structure and small size, and it can be easily manufactured and assembled.

On the other hand, the switch 80 is preferably proximity switch.

The device of the present invention can enable the auxiliary power unit to be started at the time the pedal is being pedaled, while the auxiliary power unit will be stopped when user stops pedaling the bicycle. Since the operation of the auxiliary power unit is controlled by mechanical displacement, false triggering will be eliminated.

While we have shown and described various embodiments in accordance with the present invention, it should be clear to those skilled in the art that further embodiments may be made without departing from the scope of the present invention.

What is claimed is:

1. An auxiliary power unit starting apparatus for an electric bicycle comprising:

a sprocket rotatably fixed to bicycle frame, on the sprocket being arranged a plurality of openings and a central hole, and at a side of the sprocket formed a plurality of projections;

a driving disc rotatably disposed at a side of the sprocket in such a manner that an axial tube at a side of the driving disc being engaged in the central hole of the sprocket, the driving disc provided with a plurality of limiting holes employed to be inserted correspondingly in the projections of the sprocket, at an abutting side of the driving disc abutting the sprocket being arranged a plurality of chutes each of which is slanted from a shallow end towards a deep end gradually;

a plurality of positioning springs, two ends of the respective positioning springs being hooked to the driving disc and the sprocket, respectively, so as to make the projections abut against an end of the limiting holes;

a crank arm fixed to the driving;

a plurality of triggers, each of which having a thick portion and a thin portion, a return spring axially mounted on the thin portion, and the thin portion of the trigger is set in the openings of the sprocket, so that the thick portion of the triggers abut against the deep end of the respective chutes;

a triggering disc disposed at another side of the sprocket in such a manner that the thin portion of the triggers is fixed to a surface of the triggering disc;

a switch located at the another side of the sprocket, and the triggering disc serves to trigger the switch, therefore, when crank arm rotates, the sprocket will rotate together with the crank arm, and when the projections move from one end of the limiting holes to the other, the thick portion of the triggers will move from the deep end of the chutes to the shallow end, so that the triggered will be pushed outward to trigger the switch.

2. The auxiliary power unit starting apparatus for an electric bicycle as claimed in claim 1, wherein the driving disc is integral with the crank arm.

3. The auxiliary power unit starting apparatus for an electric bicycle as claimed in claim 1, wherein a bearing is disposed between the axial tube of the driving disc and the central hole of the sprocket.

4. The auxiliary power unit starting apparatus for an electric bicycle as claimed in claim 1, wherein the switch is proximity switch.

\* \* \* \* \*